J. SANDAGE.
BARS FOR LANDSIDE BLANKS.

No. 170,020. Patented Nov. 16, 1875.

Witnesses:
R. H. Whittlesey
L. L. Frauer

Inventor:
Joshua Sandage
by Louis Bagger
his Atty.

UNITED STATES PATENT OFFICE.

JOSHUA SANDAGE, OF MOLINE, ILLINOIS.

IMPROVEMENT IN BARS FOR LAND-SIDE BLANKS.

Specification forming part of Letters Patent No. 170,020, dated November 16, 1875; application filed November 27, 1874.

*To all whom it may concern:*

Be it known that I, JOSHUA SANDAGE, of the city of Moline, in the county of Rock Island and State of Illinois, have invented certain new and useful Improvements in the Manufacture of Land-Sides for Plows; and I do hereby declare that the following is a full, clear, and exact description thereof, which will enable others skilled in the art to which it pertains to make and use it, reference being had to the accompanying drawing, which forms a part of this specification, and in which—

Figure 1:
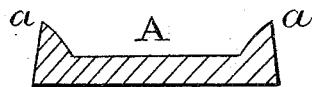
Figure 2:
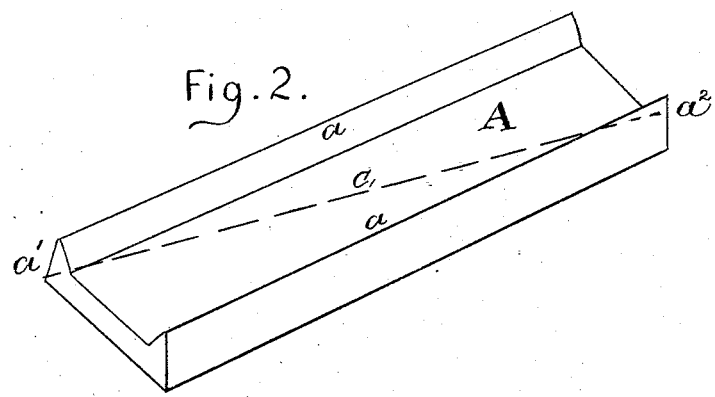
Figure 3:
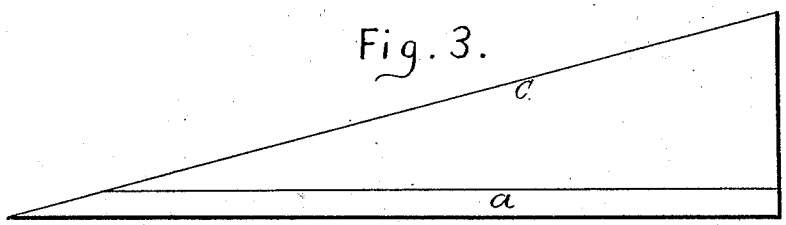
Figure 4:
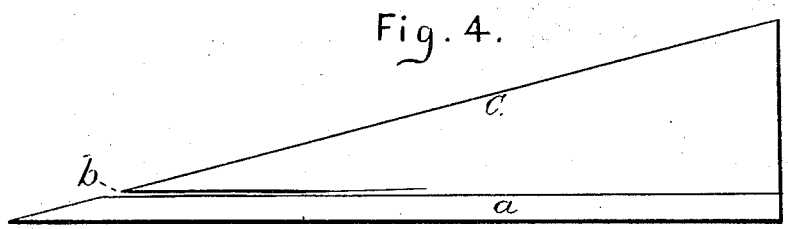

Figure 1 is a cross-section of a land-side bar. Fig. 2 is a perspective view of a section of the same. Fig. 3 is a side elevation of a land-side; and Fig. 4 is a similar view, showing the slit for the insertion of the steel point.

Similar letters of reference indicate corresponding parts in all the figures.

This invention relates to the manufacture of rolled bars for plow land-sides, said bars having two projecting sloping flanges on one side, the other side being flat, substantially as and for the purpose hereinafter set forth.

In the drawing, A represents the blank or bar, which may be rolled out of any desired length by suitable rolls, in the usual manner. This bar is flat in the middle and on the under side, as shown in Figs. 1 and 2, but has two raised flanges, $a\ a$, one at each edge, the said flanges or ribs presenting sloping sides, both externally and internally, in their relation to the flat surface of the bar. The blanks are made by cutting this bar up into pieces of the length the land-sides are to have. The next operation consists in cutting each length or section obliquely from $a^1$ to $a^2$, as indicated by the dotted line $c$, by which two land-sides are cut and shaped by one operation from one blank, with no waste of material.

The object of making the flanges $a\ a$ sloping is to produce a sharp cutting-edge along the convergence of the sloping sides.

In land-sides as ordinarily manufactured this cutting-edge is forged onto the land-side proper by a separate process, occupying much time and labor.

Another advantage derived from cutting the land-side from the bar A is, that the external slopes of the flanges $a\ a$ being necessarily uniform in each bar, and each land-side cut from a bar, the share, when forged or welded onto the land-side, will in all land-sides have a uniform pitch or inclination.

It may sometimes be found convenient to arrange an additional cutter in the drop by which I cut the blank, so as to cut by the same operation the slit $b$, one in each land-side. Into this slit a chamfered plate is inserted to form the point, and the weld is made, after heating, by one blow of the drop.

Having thus described my invention, I claim and desire to secure by Letters Patent—

As a new article of manufacture, rolled bars for plow land-sides, of the form in cross-section shown and described—that is to say, bars plain or flat on one side, and having projecting from the other side two flanges or ribs, one at each edge, said flanges presenting sloping sides, both externally and internally, in relation to the flat surface, and terminating by their convergence in an edge—substantially as and for the purpose shown and specified.

In testimony that I claim the foregoing as my own I have hereunto affixed my signature in presence of two witnesses.

JOSHUA SANDAGE.

Witnesses:
E. H. GLEASON,
S. H. CORNWALL.